United States Patent [19]

Kerko et al.

[11] Patent Number: 5,256,601
[45] Date of Patent: Oct. 26, 1993

[54] SLOW FADING PHOTOCHROMIC GLASS

[75] Inventors: David J. Kerko, Corning; Theodore R. Kozlowski, Horseheads; David W. Morgan; Theresa A. Winer, both of Corning, all of N.Y.

[73] Assignee: Corning Incorporated, Corning, N.Y.

[21] Appl. No.: 957,359

[22] Filed: Oct. 7, 1992

[51] Int. Cl.⁵ ............................. C03C 4/06; C03C 3/23
[52] U.S. Cl. ........................................ 501/13; 501/56; 501/62; 501/66; 501/67
[58] Field of Search ............... 501/13, 56, 67, 66, 501/62

[56] References Cited

U.S. PATENT DOCUMENTS

| | | | |
|---|---|---|---|
| 3,208,860 | 9/1965 | Armistead et al. | 106/34 |
| 3,630,765 | 12/1971 | Araujo | 106/54 |
| 4,190,451 | 2/1980 | Hares et al. | 106/47 |
| 4,358,542 | 11/1982 | Hares et al. | 501/13 |
| 4,407,966 | 10/1983 | Kerko et al. | 501/13 |
| 4,549,894 | 10/1985 | Araujo et al. | 65/30.11 |
| 4,948,705 | 8/1990 | Throgmorton | 430/292 |

*Primary Examiner*—Karl Group
*Attorney, Agent, or Firm*—Milton M. Peterson

[57] ABSTRACT

A silver halide photochromic glass has
a. a clear luminous transmittance of about 90%,
b. A darkened luminous transmittance at 20° C. below about 25%.
c. A fading rate at 20° C. such that, after a five minute fading interval, the glass exhibits a percent faded luminous transmittance that is no more than the darkened luminous transmittance percentage plus 15. The glass has an $R_2O-Al_2O_3-B_2O_3-SiO_2$ base composition, contains as additives, in percent by weight, 0.1-0.3% Ag, 0.25-1.0% Cl, 0-0.2% Br, 0.25-1.0% Cl+Br, the ratio of Ag:(Cl+Br) being 0.15-0.65, 0.003-0.015% CuO and 0.1-1.0% PbO and the total $R_2O$ content is 8-13.5%, wherein $R_2O$ consists of $Li_2O+Na_2O+K_2O$.

17 Claims, No Drawings

SLOW FADING PHOTOCHROMIC GLASS

FIELD OF THE INVENTION

Photochromic glasses that become very dark and fade slowly.

BACKGROUND OF THE INVENTION

Photochromic glasses darken under the influence of actinic radiation, commonly ultraviolet radiation. They return to their original state when the radiation is removed. Such glasses are developed by thermal treatment to produce crystallites of a silver halide selected from the group consisting of AgCl, AgBr and AgI, in the glass.

Glasses demonstrating photochromic behavior were originally described in U.S. Pat. No. 3,208,860 (Armistead et al.). As there described, photochromic glasses were produced in a $R_2O—Al_2O_3—B_2O_3—SiO_2$ base glass system. The base glass consisted essentially of 4-26% $Al_2O_3$, 4-26% $B_2O_3$, 40-76% $SiO_2$, and $R_2O$, the $R_2O$ being selected from the group consisting of 2-8% $Li_2O$, 4-15% $Na_2O$, 6-20% $K_2O$, 8-25% $Rb_2O$, and 10-30% $Cs_2O$, the total of these basic ingredients being at least 85%. To provide photochromic properties, the glass contained at least one halide in a minimum amount of 0.2% Cl, 0.1% Br, and 0.08% I, and silver in a minimum amount of 0.2%, 0.05% and 0.03% where the added halide is, respectively, Cl, Br, or I.

Subsequent to that basic disclosure, extensive research efforts have been made to continually develop glasses having improved photochromic properties. These efforts are evidenced by the considerable volume of patent and other literature that has been generated. Most of the research has been focused on the ophthalmic field to provide both prescription lenses and non-prescription sunglasses. Accordingly, primary interest has been in glasses that darken rapidly to a moderately low luminous transmittance under the influence of an exciting radiation, and then fade rapidly to the original transmittance when removed from the exciting radiation.

For example, darkening levels were sought ranging from about 15 to 25 percent transmittance for sunglasses to about 40 to 50 percent transmittance for comfort glasses. At the same time, ever faster fading rates were also sought. For example, a fading rate was desired such that the glass regained half its original transmittance in five minutes. It was further deemed desirable to retain rapid darkening and fading rates over the range of temperatures customarily encountered by one wearing the glasses.

A current photographic processing application requires a very different photochromic performance. This process uses a flat plate of photochromic glass as a temporary filter. The filter creates an enhanced contrast, mask image of a photographic slide or negative that may be either black and white or color. The procedure greatly enhances the quality of the image made from an original. It does this by printing the subtle tones in dark areas of negatives while attenuating the light energy through highly transparent areas.

The requirements for this application are:
1. Darkening to a transmittance below about 25 percent, preferably not over 20%.
2. Darkened color is preferably neutral grey.
3. The glass should stay darkened for several minutes when removed from the activating light.
4. The glass must fade back to the clear state once the printing process is completed. A heat fade can be used.

It is a basic object of our invention to provide photochromic glasses that rapidly darken to a very low transmittance, that fade back very slowly under ambient conditions, but may be bleached by special treatment such as heating.

Another purpose is to provide novel photochromic glasses having characteristics that particularly adapt them to use in the photographic processing application described above.

SUMMARY OF THE INVENTION

Our invention resides in part in a photochromic glass that has the following light transmitting properties across the visible portion of the spectrum when free of tint,
  a. a clear luminous transmittance of about 90%,
  b. a darkened luminous transmittance at 20° C below about 25%, preferably not over 20%.
  c. a fading rate at 20 C such that, after a five minute fading interval, the glass exhibits a percent faded luminous transmittance that is no more than the darkened luminous transmittance percentage plus 15 percentage units, that has an $R_2O—Al_2O_3—B_2O_3—SiO_2$ base composition, and that contains as additives, in percent by weight, 0.1-0.3% Ag, 0.25-1.0% Cl, 0-0.2% Br, 0.25-1.0% Cl+Br, the ratio of Ag:Cl+Br being 0.15-0.65, 0.003-0.015% CuO, 0.1-1.0% PbO, and a total content of 8-13.5% $R_2O$ wherein $R_2O$ consists of $Li_2O+Na_2O+K_2O$.

Our invention further resides in a method of controlling the darkened luminous transmittance and the fading rate of a silver halide photochromic glass that comprises the steps of formulating and mixing a batch for an $R_2O—Al_2O_3—B_2O_3—SiO_2$ base glass wherein the $R_2O$ content is 8-13.5%, and $R_2O$ consists of $Li_2O+Na_2O+K_2O$, including additives in the following controlled amounts in percent by weight based on the glass: 0.1-0.3% Ag, 0.25-1.0% Cl, 0-0.2% Br, 0.25-1.0% Cl+Br, the ratio of Ag:Cl+Br being 0.15-0.65, 0.003-0.015% CuO and 0.1-1.0% PbO, melting the batch and forming an article therefrom, and heat treating the article for up to an hour in the temperature range of 600°-700° C. to produce a photochromic glass that has
  a. a clear luminous transmittance of about 90%,
  b. a darkened luminous transmittance at 20° C. below about 25%, preferably not over 20%.
  c. a fading rate at 20° C. such that, after a five minute fading interval, the glass exhibits a percent faded luminous transmittance that is no more than the darkened luminous transmittance percentage plus 15 percentage units.

PRIOR ART

In addition to the patent noted earlier, attention is also drawn to the following United States Patents that relate to silver halide photochromic glasses. Except for U.S. Pat. No. 3,630,765, these patents are concerned with ophthalmic applications where rapid darkening and fading rates are of paramount importance.

U.S. Pat. No. 3,630,765 (Araujo) relates to photochromic glasses that contain 10-50% by weight $Ta_2O_5$, that have high refractive indices and that are useful in producing photochromic optical fibers for information display devices.

U.S. Pat. No. 4,190,451 (Hares et al.) discloses glasses where the CuO content is 0.004-0.020%, Cl is 0.1-0.25%, Ag is 0.15-0.30% and Br is 0.1-0.2%, all by weight. The molar ratio of $R_2O:B_2O_3$ is 0.55-0.85 and of $(R_2O—Al_2O:B_2O_3)$ is 0.25-0.4, and the weight ratio of Ag:(Cl+Br) is 0.65-0.95.

U.S. Pat. No. 4,358,542 (Hares et al.) discloses glasses capable of being drawn as sheet glass, having a darkened luminous transmittance at 20° C. below 25% and having a fading rate such that the faded luminous transmittance after a five minute fading interval is double the darkened luminous transmittance.

U.S. Pat. No. 4,407,966 (Kerko et al.) discloses glasses that are very fast fading and that contain 2.5 up to 3.5% $Li_2O$ and 0.1-0.15% PbO.

U.S. Pat. No. 4,549,894 (Araujo et al.) discloses glasses containing 0.1-0.2% Ag, 0.1-1.0% $CeO_2$ to absorb ultraviolet and 0.1-1.5% $SbO_3$ and/or $As_2O_3$ to restore photochromic properties.

U.S. Pat. No. 4,948,705 (Throgmorton) discloses the use of a photochromic sunglass lens as a highlight mask for photoreproduction of transparencies having highlight areas. The glass is so constituted that radiation in the blue visible range, as well as the ultraviolet range, will darken the glass, and red radiation will fade it clear.

DESCRIPTION OF THE INVENTION

Our present invention extends the darkened luminous transmittance of silver halide photochromic glasses to very low levels of about 5 to 25%, preferably 10 to 20%, when the glasses are exposed to activating light. However, it reverses the usual fast fading rate that is desired for ophthalmic purposes when the activating light is removed. Rather, it provides a very slow fading rate.

Darkened luminous transmittance is the percent of impinging radiation across the visible spectrum that is transmitted by a photochromic glass after being exposed to an activating light source for a fixed time. The source may be an ultraviolet lamp and the time may be fifteen or twenty minutes.

The measured percentage observed is commonly designated as transmission (T) with respect to time. Thus, measurements reported in this application were made on a Huntermeter after 20 minutes exposure and are termed $T_{D20}$. Measurements may be made on other mechanisms as well. One such mechanism, commonly used, is referred to as a solar simulator. A time of 15 minutes is frequently employed with a solar simulator. Measurements on some glasses indicate greater darkening with a solar simulator since the wavelengths of light employed are longer.

The fade rate is usually expressed as an absolute value, rather than a rate. It is the percent of visible light transmittance regained after a fixed time of fading, that is the time after the activating radiation is removed. Commonly, the time is five minutes and the value is expressed as $T_{F5}$. For present purposes, the $T_{F5}$ value should also be low so that the difference in the two values, the fade rate, is small, preferably not more than 10 percentage units.

The clear luminous transmittance of a photochromic glass commonly designated as T0, is the percent of impinging radiation across the visible spectrum that is transmitted prior to any darkening of the glass and in the absence of glass colorants. It is well known that such factors as surface reflection reduce this original transmittance to values of about 85 to 92%. It is customary to use a nominal value of 90% where no fixed colorants are present. It will be appreciated that minute amounts of such colorants may be included to move CIE chromaticity coordinates closer to values indicating a neutral gray.

We have found a number of factors that can influence the darkening of a photochromic glass and/or its fade rate. These factors include the contents and relationships of several additives to an $R_2O—Al_2O_3—B_2O_3$-$SiO_2$ base glass to impart and/or control photochromic behavior. The additives include the halides Cl and Br, silver and lead. Also, the alkali metal oxides ($R_2O$), both individually and severally, may provide a means of control. The term $R_2O$ is used here to encompass the principal alkali metal oxide used in glass production, viz., $Li_2O$, $Na_2O$ and $K_2O$. Our invention derives essentially from determining the necessary limits within which these controlling factors may be varied.

Initially, we have found that the contents of both silver and the halogens, chlorine and bromine, must be controlled to achieve the desired ends. The silver content should by at least 0.1% to form the silver halide crystals necessary for photochromicity. However, larger amounts appear to favor faster fading. Therefore, no advantage is seen in a silver content over about 0.30%. Preferably the content is not over 0.20%. All percentages are by weight, based on the glass as 100%.

At least about 0.25% chlorine, calculated as Cl, is required to combine with the Ag, and the content may range up to 1.0%. When the lead oxide content is low, the chlorine content preferably is at least 0.50% to provide the desired darkening and slow fade. Bromine is not essential, but a small amount is usually desirable as a supplement for chlorine. The total content of Cl+Br normally will not exceed about 1%.

We have further found that the relationship between the silver and the halogen contents is significant. As a rule of thumb, the desired transmittance properties are favored by low silver content and high halogen content, particularly if the PbO content is low. The ratio of Ag:(Cl+Br) should be at least 0.15, but should not exceed about 0.65.

Darkening and fade rate are also affected by the PbO content as intimated earlier. At least 0.1% is required and larger amounts are preferred. In particular, if the PbO content is below about 0.25%, the Cl+Br content should kept above 0.50%. Conversely, if the Cl+Br content falls below about 0.50%, the PbO content is preferably above 0.50%.

Another important factor in controlling darkening and fade rate is the alkali metal oxide ($Na_2O$, $Li_2O$ and $K_2O$) content. Both the total content and the mix are significant. The total content must be at least about 8% and may range up to 13.5%. Lesser amounts favor a faster fade rate. Larger amounts may give other problems such as poor durability.

While all three alkali metal oxides need to be present, the $Na_2O$ content must be kept below 2%, and preferably below 1.5%. $Li_2O$ appears to favor slow fading in amounts of 2-3%, and may be present up to about 3.5%.

We believe our invention is generally applicable in the broad range of $R_2O—Al_2O_3—B_2O_3—SiO_2$ glasses known to provide photochromic properties in the presence of a silver halide crystal phase, except as indicated above with respect to $R_2O$ content. However, commercial practice has shown that a much narrower composition range is preferable. Accordingly, our preferred base glass is as follows:

| | |
|---|---|
| $SiO_2$ | 55-61 |
| $B_2O_3$ | 18-21 |
| $Al_2O_3$ | 5-11 |
| $R_2O$ | 8-13.5 |

TABLE I sets forth compositions that further illustrate our invention. These compositions are calculated from glass batches, and are presented in parts by weight which approximate percentages. Glasses having these compositions have been melted and molded to provide test pieces for property measurements. The glasses were melted in a small continuous melting unit that operates at about 1450° C. and delivers about 20 lbs (9.1 kgs) of glass an hour.

TABLE I

| | 1 | 2 | 3 | 4 | 5 |
|---|---|---|---|---|---|
| Base Glass (weight percent) | | | | | |
| $SiO_2$ | 59.4 | 59.4 | 59.0 | 59.5 | 59.5 |
| $B_2O_3$ | 19.7 | 19.7 | 19.6 | 19.8 | 19.4 |
| $Al_2O_3$ | 9.7 | 9.7 | 9.6 | 7.1 | 6.1 |
| $Li_2O$ | 2.2 | 2.2 | 2.2 | 3.1 | 1.2 |
| $Na_2O$ | 1.3 | 1.3 | 1.3 | .8 | .6 |
| $K_2O$ | 6.4 | 6.4 | 6.3 | 8.0 | 11.1 |
| $ZrO_2$ | — | — | — | 4.1 | 3.9 |
| Photochromic Components (batched/analyzed) | | | | | |
| Ag | .15/.129 | .15/.12 | .15/.11 | .20/.20 | .235/.183 |
| CuO | .009/.009 | .006/.005 | .008/.008 | .008/.012 | .007/.006 |
| PbO | .12/.12 | .12/.12 | .71/.71 | .96/.77 | .119/.12 |
| Cl | .50/.489 | .50/.50 | .60/.58 | .27/.28 | .27/.24 |
| Br | .06/.052 | .06/.05 | .08/.06 | .07/.06 | .099/.048 |

Test pieces from Examples 1-3 were thermally treated for twenty minutes at about the glass softening point (660° C.) to develop photochromic behavior. Test pieces from Examples 4 and 5 were also treated at 660° C., but for thirty minutes, for the same purpose. $T_0$ (original transmittance), $T_{D20}$ and $T_{F5}$ values were measured on a Huntermeter, and are recorded in TABLE II.

TABLE II

| | 1 | 2 | 3 | 4 | 5 |
|---|---|---|---|---|---|
| $T_0$ | 91.0 | 91.4 | 89.6 | 90.3 | 90.4 |
| $T_{D20}$ | 12.1 | 13.2 | 9.3 | 14.1 | 15.7 |
| $T_{F5}$ | 18.8 | 16.1 | 10.8 | 21.1 | 32.8 |

It will be observed that Example 4 is marginal in that its faded transmittance is on the high side. Example 5 has a rather high faded transmittance, and illustrates the effect of relatively high Ag content with both PbO and the halogens on the low side.

TABLE III sets forth, in approximate percentages by weight, six additional glass compositions that illustrate certain critical features of our invention. Compositions 6 and 11 represent glasses marginally within the scope of our invention. Compositions 7-10, inclusive, represent glasses that are similar in composition to the glasses of our invention, but have very different properties.

Glass batches, from which these compositions were calculated, were melted and molded to provide test pieces for property measurements. Measurements were made in the same manner as for Examples 1-5, and are reported in TABLE IV as in TABLE II.

TABLE III

| | 6 | 7 | 8 | 9 | 10 | 11 |
|---|---|---|---|---|---|---|
| $SiO_2$ | 54.4 | 59.1 | 58.1 | 59.9 | 59.0 | 57.7 |
| $B_2O_3$ | 20.3 | 19.6 | 18.2 | 19.2 | 19.6 | 18.1 |
| $Al_2O_3$ | 7.2 | 9.6 | 6.2 | 6.8 | 9.6 | 6.2 |
| $Li_2O$ | 4.3 | 2.2 | 1.8 | 3.0 | 2.2 | 1.4 |
| $Na_2O$ | 0.8 | 2.4 | 4.1 | 0.7 | 2.4 | 5.9 |
| $K_2O$ | 6.0 | 6.3 | 5.7 | 5.7 | 6.3 | 4.3 |
| $ZrO_2$ | 4.4 | — | 5.0 | 3.9 | — | 5.0 |
| $TiO_2$ | 1.0 | — | — | — | — | — |
| Ag | 0.25 | 0.15 | 0.19 | 0.32 | 0.15 | 0.19 |
| CuO | 0.008 | 0.009 | 0.008 | 0.008 | 0.009 | 0.008 |
| PbO | 0.8 | — | — | 0.10 | 0.12 | 0.8 |
| Cl | 0.36 | 0.50 | 0.50 | 0.27 | 0.50 | 0.30 |
| Br | 0.11 | 0.06 | 0.16 | 0.07 | 0.06 | 0.16 |
| $Sb_2O_3$ | 0.01 | — | — | — | — | — |

TABLE IV

| | | | | | | |
|---|---|---|---|---|---|---|
| $T_0$ | 85.8 | 90.7 | 91.2 | 90.1 | 90.7 | 91.7 |
| $T_{D20}$ | 23.7 | 52.5 | 56.0 | 43.1 | 33.6 | 24.5 |
| $T_{F5}$ | 3.8 | 28.9 | 23.6 | 37.0 | 34.8 | 13.3 |

The glasses were melted for three hours in platinum crucibles in a gas-fired furnace operating at 1450° C.

Examples 7 and 8 illustrate the effect of omitting PbO from our present glasses. Example 9 illustrates the combined effect of high silver content and relatively low halogen and lead oxide contents. Example 10 illustrates the effect of low PbO content in the absence of a more favorable alkali metal oxide mix.

We claim:

1. A photochromic glass having the following light transmitting properties across the visible portion of the spectrum when free of tint,
    a. a clear luminous transmittance of about 90%,
    b. a darkened luminous transmittance at 20° C. below about 25%,
    c. a fading rate at 20° C. such that, after a five minute fading interval, the glass exhibits a percent faded luminous transmittance that is no more than the darkened luminous transmittance percentage plus 15 percentage units, having an $R_2O$—$Al_2O_3$—$B_2O_3$—$SiO_2$ base composition, and containing as additives, in percent, by weight, 0.1-0.3% Ag, 0.25-1.0% Cl, 0-0.2% Br, 0.25-1.0% Cl+Br, the ratio by weight of Ag:Cl+Br being 0.15-0.65, 0.003-0.015% CuO, 0.1-1.0% PbO and 8-13.5% total $R_2O$, wherein $R_2O$ consists of $Li_2O$+$Na_2O$+$K_2O$, the $Na_2O$ being present in an amount less than 2%.

2. A photochromic glass in accordance with claim 1 wherein the darkened luminous transmittance is in the range of 10-20%.

3. A photochromic glass in accordance with claim 1 wherein the base glass composition is 55-61% $SiO_2$, 18-21% $B_2O_3$, 5-11% $Al_2O$, and 8-13.5% $R_2O$.

4. A photochromic glass in accordance with claim 1 wherein the $R_2O$ is made up of 1-3.5% $Li_2O$, 0.5 to less than 2.0% $Na_2O$ and 5-12% $K_2O$.

5. A photochromic glass in accordance with claim 4 wherein the $Li_2O$ content is 2-3%.

6. A photochromic glass in accordance with claim 1 wherein the Ag content is not over 0.2%.

7. A photochromic glass in accordance with claim 1 wherein the ratio by weight of Ag:(Cl+Br) is in the range of 0.20 to 0.50.

8. A photochromic glass in accordance with claim 1 wherein the content of Cl is at least 0.50%.

9. A photochromic glass in accordance with claim 1 wherein the content of PbO is at least 0.50%.

10. A method of controlling the darkened luminous transmittance and the fading rate of a silver halide photochromic glass that comprises the steps of formulating and mixing a batch for an $R_2O$—$Al_2O_3$—$B_2O_3$—$SiO_2$ base glass, wherein the $R_2O$ content is 8-13.5% and consists of $Li_2O+Na_2O+K_2O$, the $Na_2O$ being present in an amount less than 2%, including additives in the following controlled amounts in percent by weight based on the glass: 0.1-0.3% Ag, 0.25-1.0% Cl, 0-0.2% Br, 0.25-1.0% Cl+Br, the ratio by weight of Ag:Cl+Br being 0.15-0.65, 0.003-0.015% CuO and 0.1-1.0% PbO, melting the batch and forming an article therefrom, and heat treating the article for up to an hour in the temperature range of 600-700° C. to produce a photochromic glass that has a. a clear luminous transmittance of about 90%,
   b. a darkened luminous transmittance at 20° C. below about 25%,
   c. A fading rate at 20° C. such that, after a five minute fading interval, the glass exhibits a percent faded luminous transmittance that is no more than the darkened luminous transmittance percentage plus 15 percentage units.

11. A method in accordance with claim 10 wherein the base glass batch is formulated to provide a base glass composition consisting essentially of, as calculated on the oxide basis in percent by weight, 55-61% $SiO_2$, 18-21% $B_2O_3$, 5-11% $Al_2O_3$ and 8-13.5% $R_2O$.

12. A method in accordance with claim 11 wherein the $R_2O$ is made up of 1-3.5% $Li_2O$, 0.5 to less than 2.0% $Na_2O$ and 5-12% $K_2O$.

13. A method in accordance with claim 10 wherein the Ag content is not over 0.2%.

14. A method in accordance with claim 10 wherein the ratio by weight of Ag:(Cl+Br) is in the range of 0.20 to 0.50.

15. A method in accordance with claim 10 wherein the Cl+Br is at least 0.50% when the PbO is less than 0.25%.

16. A method in accordance with claim 10 wherein the PbO content is at least 0.50% when the Cl+Br content is less than 0.30%.

17. A method in accordance with claim 10 wherein the article is heat treated at about 660° C. for about twenty to thirty minutes.

* * * * *